United States Patent

(12) United States Patent
Liu

(10) Patent No.: US 6,458,310 B1
(45) Date of Patent: Oct. 1, 2002

(54) PROCESS OF MAKING A POLYMERIC MATERIAL HAVING A MICROPOROUS MATRIX

(75) Inventor: Guojun Liu, Calgary (CA)

(73) Assignee: University Technologies International, Inc. (CA)

( * ) Notice: Subject to any disclaimer, the term of this patent is extended or adjusted under 35 U.S.C. 154(b) by 184 days.

(21) Appl. No.: 09/585,285

(22) Filed: Jun. 2, 2000

Related U.S. Application Data

(62) Division of application No. 09/034,293, filed on Mar. 4, 1998, now abandoned.
(60) Provisional application No. 60/049,775, filed on Mar. 4, 1997.

(51) Int. Cl.⁷ .................. B29C 35/08; B29C 67/20; B29C 69/00
(52) U.S. Cl. .................. 264/425; 264/41; 264/216; 264/236
(58) Field of Search .................. 264/41, 216, 236, 264/425

(56) References Cited

U.S. PATENT DOCUMENTS

| | | | |
|---|---|---|---|
| 4,177,222 A | 12/1979 | Thompson | 525/432 |
| 4,197,148 A | 4/1980 | Shinomura | 156/79 |
| 4,517,142 A | 5/1985 | Baniel | 264/425 |
| 4,761,233 A | 8/1988 | Linder et al. | 210/500.37 |
| 5,238,613 A | 8/1993 | Anderson | 264/425 |
| 5,326,629 A | 7/1994 | Vaughn et al. | 442/194 |
| 5,700,903 A | 12/1997 | Hancock et al. | 528/373 |

*Primary Examiner*—Leo B. Tentoni
(74) *Attorney, Agent, or Firm*—Katten Muchin Zavis Rosenman

(57) ABSTRACT

A polymeric material including a microporous matrix disposed in a multi-block polymer having a backbone of the general formula:

$$[(A)_n-(B)_m-(X)_l]_p$$

wherein: A is a first copolymerized monomer; B is a second copolymerized monomer; X is a third copolymerized monomer the same as or different from A; n and m are the same or different and are each an integer in the range of from 30 to 3000; is 0 or an integer in the range of from 30 to 3000; p is an integer in the range of from 1 to 100; wherein the microporous matrix is defined by reactive cleavage of at least a portion of a pendant moiety on B. The polymeric material is produced by a process which comprises cleavage of at least a portion of pendant moiety on B while leaving the backbone of the copolymer intact. This approach facilities production of a substantially uniform distribution of very small pores of substantially uniform dimension. Ideally the polymer material is produced in the form of a thin membrane which can be used in a range of industrial applications including, for example, technologies such as reverse osmosis, ultrafiltration, pervaporation and electrolysis.

23 Claims, 3 Drawing Sheets

PROCESS OF MAKING A POLYMERIC MATERIAL HAVING A MICROPOROUS MATRIX

This application is a divisional of U.S. patent application Ser. No. 09/034,293, filed Mar. 4, 1998 (now abandoned), which claims benefit of U.S. patent application Ser. No. 60/049,775, filed Mar. 4, 1997.

BACKGROUND OF THE INVENTION

1. Field of the Invention

The present application relates to a polymeric material and to a method for production thereof.

2. Description of the Prior Art

Heretofore, polymeric materials in the form of membranes have found utility in a range of industrial applications including, for example, technologies such as reverse osmosis, ultrafiltration, pervaporation and electrolysis—see *Synthetic Membranes and Membrane Separation Process* (Matsuura), CRC Press: Boca Raton, 1993.

More recent applications of this technology have been directed to the production of membranes with substantially uniform pores sizes to be used as templates for nanomaterial fabrication—see any of *Science* 1994, 266, 1961 (Martin); *Chem. Mater.* 1996, 8, 1739 (Martin); *Science* 1995, 268, 700 (Nishizawa et al); and *Science* 1995, 270, 68.

To date, the prior art has attempted a number of approaches for producing polymeric membranes comprising relatively small pores.

These approaches include quenching the morphology of a solvent-swollen polymer film by the sudden immersion thereof in a poor solvent or the thermal quenching of a polymer film stretched at a higher temperature—see *Synthetic Membranes and Membrane Separation Process* (Matsuura), CRC Press: Boca Raton, 1993. In essence, the pores in the resulting polymeric membranes are kinetically "frozen" in a matrix and the performance of the polymeric membrane is very sensitive to minor variations in the processing conditions.

U.S. Pat. No. 5,425,865 [Singleton et al.] relates to a composite polymer membrane—see column 1, lines 6–9. The polymer membrane comprises a first polymeric material providing a porous matrix and a second polymeric material which at least partially fills and thereby blocks the pores of the matrix, at least one of the two polymeric materials (preferably both) being cross-linked—see column 2, lines 47–53. The process to produce the subject polymeric membrane is based on initially providing the first polymeric material having the porous matrix incorporated therein—see column 2, lines 54–66.

U.S. Pat. No. 5,342,521 [Bardot et al.] relates to a reverse osmosis or nanofiltration membrane usable in the agroalimentary and pharmaceutical industries—see column 1, lines 5–8. The subject membrane comprises a laminate structure made up of: (i) an inorganic material porous support; (ii) a first inorganic material mesoporous layer having a mean pore radius below 10 nm coated on (i); and (iii) inorganic mineral polymer or organic polymer second active layer placed on (ii) and having a prescribed thickness—see column 2, lines 5–15.

U.S. Pat. No. 5,238,613 [Andersen] relates to polymeric, microporous membrane materials characterized by a continuous, triply-periodic, highly branched and interconnected porous space methodology having a globally uniformed, pre-selected pore size—see column 2, lines 62–66. The subject membrane can be produced by "chemical erosion" or "chemical degradation" in one component of a block copolymer—see columns 6, lines 54–59 and column 8, lines 5–12. This approach is discussed in more detail at column 14, line 19 to column 16, line 58. This excerpt of the reference makes it relatively clear that the porous structure is achieved by complete degradation of a susceptible block in the block copolymer resulting in scission of the polymer backbone. Examples of such degradation include ozonolysis (column 15, lines 42–54), radiation (column 15, lines 55–65) and thermal decomposition (column 16, lines 20–24).

U.S. Pat. No. 5,130,025 [Lefebvre et al.] relates to a new highly permeable anisotropic synthetic membrane comprising a multi-layered structure (preferably 4–12 layers), with each layer serving as a molecular screen of precise molecular weight—see Abstract. Between each membrane layer are rows of alveolae with adjacent alveolae in adjacent rows being connected by means of channels of molecular dimensions—see Abstract.

U.S. Pat. No. 5,066,401 [Müller et al.] relates to a membrane based on two polymers—see column 1, lines 9–14. This membrane is modified to confer hydrophilic properties thereto—see column 2, lines 30–39. One approach by which hydrophilicity can be conferred to the membrane is to subject the membrane to chemical modification such as hydrolysis, transesterification and/or aminolysis—see column 6, line 1 to column 8, line 30. It is important to bear in mind that this reference teaches chemical modification for the sole purpose of conferring hydrophilicity to a membrane already having a porous structure.

U.S. Pat. No. 5,049,275 [Gillberg-LaForce et al.] relates to microporous membranes incorporating a vinyl polymer within the pores to result in modified properties of the membrane—see column 1, lines 5–8. The approach in this reference is to start with a microporous membrane and incorporate and familiarize in the pores of the membrane a polymerizable vinyl monomer—see column 3, lines 26–37. The purported advantage of this approach is the ability to modify a hydrophobic microporous membrane with a hydrophilic monomer—see column 3, lines 47–52.

U.S. Pat. No. 5,028,335 [Sleytr et al.] relates to a structure comprising at least one membrane with continuous pores having a defined diameter range—see column 1, lines 16–23. The purported advantage of the invention appears to be the ability to link foreign molecules with protein molecules or protein containing molecules—see column 2, lines 55–56.

U.S. Pat. No. 4,923,608 [Flottmann et al.] relates to a flat membrane derived from sheets of organic polymers, glass or ceramic materials having a defined pore structure produced by erosion of the membrane material using one or more pulsed lasers—see column 1, lines 8–17.

U.S. Pat. No. 4,595,707 [McCreedy et al.] relates to microporous membranes comprised of a glassy polymer composition (optionally cross-linked) in a polymeric domain grafted to at least a portion of the porous structure of the membrane—see column 2, lines 32–38. The approach here is to start with a membrane of the glassy polymer and subject that membrane to "crazing" in the presence of monomers which are polymerizable with the polymer composition during crazing leading to formation of the microporous structure—see column 2, lines 17–31.

While the prior art approaches for production of polymeric membranes have met with a varying degree of success, the art is in need of a polymeric membrane having a porous structure, the pore dimension of which is "tuneable" to a particular application. In other words, it would be desirable to have a polymeric material, such as a membrane, which could be produced readily and precisely with a pre-selected pore dimension. It would also be desirable to have a polymeric material, such as a membrane, which could be produced with very small pores (e.g. <50 nm).

SUMMARY OF THE INVENTION

Accordingly, in one of its aspects, the present invention provides a polymeric material comprising a microporous matrix disposed in a multi-block polymer having a backbone of the general formula:

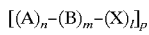

wherein:
A is a first copolymerized monomer;
B is a second copolymerized monomer;
X is a third copolymerized monomer the same as or different from A;
n and m are the same or different and are each an integer in the range of from 30 to 3000;
l is 0 or an integer in the range of from 30 to 3000;
p is an integer in the range of from 1 to 100;
wherein the microporous matrix is defined by reactive cleavage of at least a portion of a pendant moiety on B.

In another of its aspects, the present invention provides a process for producing a polymeric material having a microporous matrix from a multi-block copolymer having a general formula:

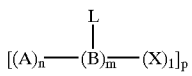

wherein:
A is a first copolymerized monomer;
B is a second copolymerized monomer;
X is a third copolymerized monomer the same as or different from A;
L is a leaving group, at least a. portion of which is cleavable;
n and m are the same or different and are each an integer in the range of from 30 to 3000;
l is 0 or an integer in the range of from 30 to 3000;
p is an integer in the range of from 1 to 100; the process comprising the steps of:
(i) cleaving at least a portion of L from the multi-block copolymer to produce polymeric material having an intact backbone; and
(ii) forming the microporous matrix in the multi-block copolymer at locations from which the at least a portion of L is removed from the multi-block copolymer.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
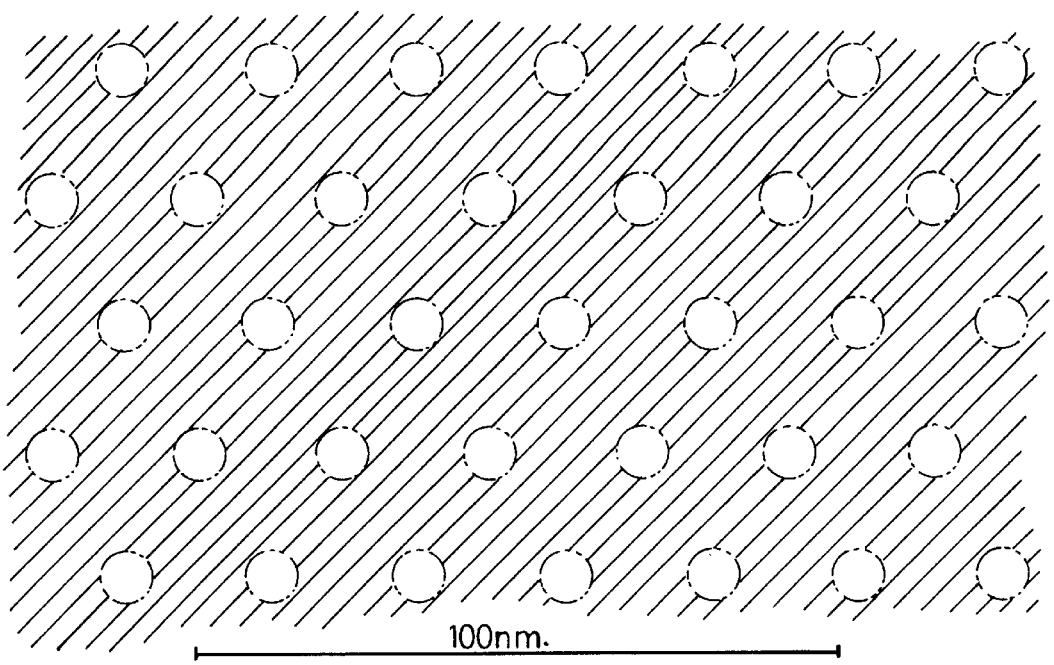
FIGS. 1 and 3–5 illustrate transmission electron micrographs of various polymeric membranes.

Thus, the present inventor has discovered that a polymer material may be treated to comprise a microporous matrix made of extremely small pores ("nanometer-sized pores" or "nanochannels") by selectively removing at least a portion of a pendant moiety from a block in a multi-block copolymer. This approach is in direct contrast with the prior art approach of degrading a polymer material by chain scission to define a porous structure. A key advantage of the present approach is a significant improvement in control over the size (very small pore sizes are achievable) and size distribution of the pores in the polymer material. Another advantage is that formation of the pore structure is spontaneous and driven thermodynamically thereby improving the reproducibility of the process used to make the polymer material containing the pore structure. The result of this approach is that it confers to the user the ability to custom tune the pore structure of the polymer material to a desired dimension (i.e. it provides tunable nanochannels) by judicious selection of functional, pendant moieties on one block in the multi-block copolymer and the proportion of this block in the multi-block copolymer.

In the present polymer material, a multi-block copolymer is modified to comprise a microporous matrix. In this regard, if one considers a diblock copolymer (the simplest case of multi-block copolymer) as, notionally, $A_n$–$B_m$, the approach is to select blocks A and B to contain fundamentally different polymerized monomers. Specifically, block B contains a polymerized monomer having a pendent moiety, at least a portion of which is capable of being cleaved from the monomer without cleavage or scission of the backbone of the copolymer. On the other hand, block A contains a polymerized monomer which is relatively stable compared to block B. Preferably, block A contains a polymerizable monomer having a cross-linkable functionality or pendant moiety.

Ideally, the proportion of A and B (i.e. the values chosen for n and m respectively) are also chosen so that the resulting block copolymer contains thermodynamically stable ordered phases, preferably comprising substantially cylindrical micro-domains of block B (the discontinuous phase) uniformly distributed in block A (the continuous phase. When at least a portion of the pendant moiety on block B is cleaved and removed, the space previously occupied by the removed portion of the monomer becomes a void in the polymer material. Since the micro-domains of block B are preferably uniformly distributed in block A, cleavage and removal of at least a portion of the pendant moiety serves to define a uniform distribution of nanochannel pores in the polymer material. For more information, see *Annu. Rev. Phys. Chem.* 1990, 41, 525.

While the form of the present polymer material is not particularly restricted, it is preferred that the polymer material be in the form of a thin membrane. Preferably, the membrane has a thickness less than about 20 µm, more preferably in the range of from about 0.5 to about 15 µm, even more preferably in the range of from about 0.5 to about 10 µm, most preferably in the range of from about 0.5 to about 5 µm. This facilitates formation of substantially cylindrical pores through the entire thickness of the polymer material. Other physical forms for the polymer material are also possible, such as nanospheres, cylinders and the like.

The starting material for the present process is a multi-block copolymer having a general formula:

wherein:

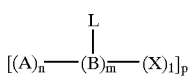

A is a first copolymerized monomer;
B is a second copolymerized monomer;
X is a third copolymerized monomer the same as or different from A;
L is a cleavable leaving group;
n and m are the same or different and are each an integer in the range of from 30 to 3000;
l is 0 or an integer in the range of from 30 to 3000;
p is an integer in the range of from 1 to 100.

Thus, when l is 0 and p is 1, the multi-block copolymer is a diblock copolymer—this is the preferred form of the multi-block copolymer.

Preferably n and m are the same or different and are each an integer in the range of from 50 to 2000, more preferably. in the range of from 50 to 1000, most preferably in the range of from 50 to 500.

Preferably, wherein p is 1.

The polymerized monomer used for A is not particularly restricted. Preferably, A is a polymerized monomer capable of cross-linking other such polymerized monomers in adjacent chains of the multi-block copolymer. Thus, in one embodiment, A may be a polymerized monomer selected from one of the following:

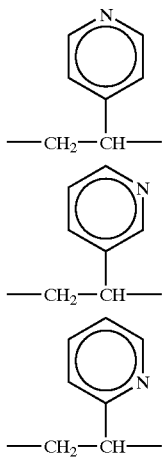

As is known in the art, the pyridinyl moiety in this embodiment may be chemically cross-linked upon reaction with, for example, 1,2-dibromoethane. In another embodiment, A may be a polymerized monomer selected from one of the following:

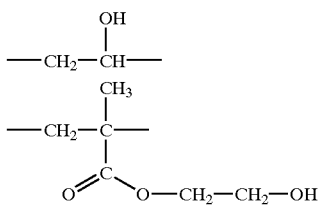

As is known in the art, the hydroxy moiety may be cross-linked by reaction with bis(acid chloride) compounds such as oxalic acid dichloride. In yet another embodiment, A may be a polymerized monomer having the following formula:

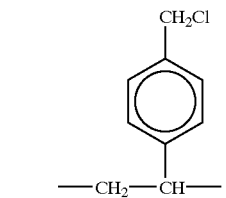

As known in the art, the chloro moiety may be cross-linked by reaction with, for example, 1,2-diaminoethane.

The most preferred embodiment of A is a polymerized monomer having the following formula:

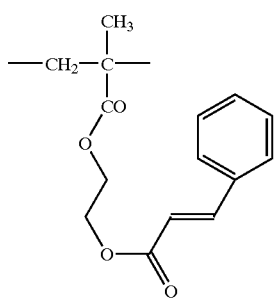

Upon exposure to ultraviolet radiation, the double bond in the pendant moiety to form a 1,2-cycloaddition product with the double bond in the pendant moiety of an adjacent polymer chain.

The polymerized monomer used for B comprising pendant leaving group L is not particularly restricted. Preferably, polymerized monomer B is selected such that at least a portion of the pendant leaving group L may be readily cleaved with little or no effect on the backbone of the multi-block copolymer. Thus, in one embodiment, cleavable leaving group L may be comprised in a pendant moiety selected from the group generally comprising esters, ethers and amides. Non-limiting examples of a polymerized monomer B comprising leaving group L may be selected from the following:

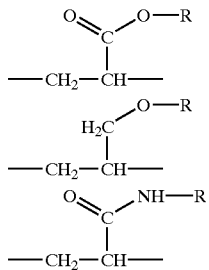

wherein R is selected from the group comprising methyl, ethyl, propyl, t-butyl, benzyl and naphthyl. As is known in the art, these pendant moieties may be readily hydrolyzed resulting in cleavage of a portion of leaving group L (i.e. cleavage of R) from polymerized monomer B. In another embodiment, B comprising leaving group L may be a polymerized monomer having the following formula:

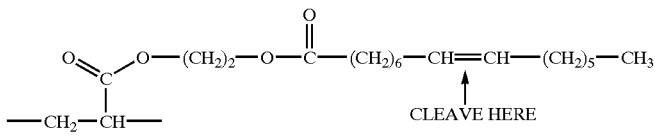

As is known in the art, the double bond in the pendant moiety may be cleaved by ozonolysis, thereby resulting in removal of a heptyl moiety.

The most preferred embodiment of B comprising leaving group L is a polymerized monomer having the following formula:

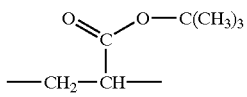

In this embodiment, the pendant moiety may be initially reacted with trimethylsilyl iodide followed by hydrolysis (see FIG. 2 and the Example hereinbelow) resulting in cleavage of the t-butyl moiety.

Thus, as will be appreciated by those of skill in the art, the particular selected of polymerized monomers A and B is not particularly restricted. The general requirements for A and B is that they are capable of being polymerized to produce a multi-block copolymer and that B further comprises a leaving group L, at least a portion of which may be cleaved therefrom with no effect on the backbone of the resulting polymer. The nature of the chemistry used to effect the cleavage is not particularly restricted. Thus, depending on the nature of leaving group L, cleavage of a portion thereof may be effected by hydrolysis, oxidation, photooxidation, photolysis and the like. Cleavage of a portion of leaving group L may also be achieved through thermal degradation. For more information, see the Encyclopaedia of Polymer Science, Volume 4, pages 630–692.

It is preferred that a portion of substantially all leaving groups L pendent polymerized monomer B be cleaved in the multi-block copolymer. This facilitates production of a substantially uniform distribution of cylindrical pores of a substantially uniform dimension.

The resultant polymer material product comprises a microporous matrix. Preferably, the pores are cylindrical and have a diameter in the range of from about 0.5 to about 20 nm. Ideally the polymer material is produced in the form of a thin membrane which can be used in a range of industrial applications including, for example, technologies such as reverse osmosis, ultrafiltration, pervaporation and electrolysis.

Embodiments of the invention will be described with reference to the following Example which is for illustrative purposes only and should not be used to limit the scope of the invention.

EXAMPLE

The multi-block copolymer used in this Example was poly(t-butyl acrylate)-block-poly(2-cinnamoylethyl methacrylate), a diblock copolymer also known as PtBA-b-PCEMA.

Two versions (hereinafter referred to as Polymer I and Polymer II, respectively) of the PtBA-b-PCEMA diblock copolymer were produced for use in this Example. Each of Polymer I and Polymer II had the following general structure:

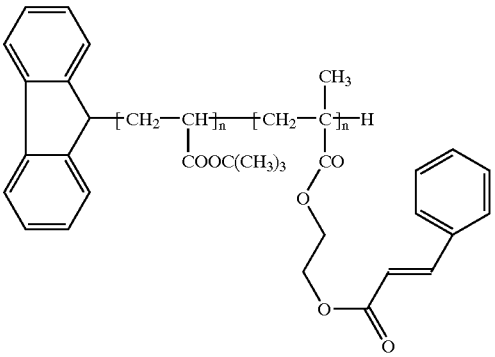

In Polymer I, n was 227 and m was 365, whereas for Polymer II, n was 380 and m was 644.

Initially, poly(t-butyl acrylate)-block-poly(2-trimethylsilyl ethyl methacrylate), also known PtBA-b-P (TMS-HEMA) and a precursor to PtBA-b-PCEMA, was synthesized by sequential anionic polymerization of t-butyl acrylate and 2-trimethylsilyl ethyl methacrylate (TMS-HEMA) using flurenyl lithium as the initiator—see *Macromolecules* 1997, 30, 488. The 2-trimethylsilyl moiety was then cleaved by hydrolysis PtBA-b-P(TMS-HEMA) in a 1:4 solution of methanol and tetrahydrofuran to produce poly (t-butyl acrylate)-block-poly(2-hydroxyethyl methacrylate), also known as PtBA-b-PHEMA. PtBA-b-PHEMA was then reacted with a stoichiometric excess of trans-cinnamoyl chloride in pyridine to produce PtBA-b-PCEMA.

The polydispersity indices of Polymer I and II were determined by gel permeation chromatography against PS standards and were found to be 1.10 and 1.18, respectively. The tBA to CEMA repeating units ratios of Polymer I and II were determined by NMR and were found to be 0.62 and 0.59, respectively. The weight-average molar masses of Polymer I and II were determined using light scattering techniques (following the Zimm method) and were found to be $1.27 \times 10^5$ and $2.21 \times 10^5$ g/mole, respectively.

Transmission electron microscopy was used to demonstrate cylindrical phase formation attributable to the PtBA block. Thus, PtBA-b-PCEMA (0.2 g) dissolved in toluene (2.0 mL) was added to a polyethylene capsule. The sample was dried at room temperature for 1 day, at 60° C. under 30 cmHg pressure for 3 days, and then annealed at 110° C. under argon for two weeks. The annealed sample was sectioned by ultramicrotomy (Ultracut-E, Reichert-Jung) to slices having a thickness of approximately 50 nm. The microtomed samples were stained by $OsO_4$ vapor overnight and then viewed with a Hitachi-7000 electron microscope operated at 100 kV.

FIG. 1 illustrates the TEM image of such a sectioned sample of Polymer I. The hexagonaly packed light circles represent PtBA cylinders disposed orthogonally to the illustrated view. The continuous phase is darker, which is attributable to reaction of the aliphatic double bonds of PCEMA with the $OsO_4$ used for staining. The diameter of the PtBA cylinders was on the order of 10 nm. A similar morphology was observed for Polymer II was the diameter of the PtBA cylinders being on the order of 15 nm. Thus, the size of the PtBA phase increases as the molar mass of this block of the diblock copolymer is increased.

The sectioned films were then irradiated for 8 seconds with ultraviolet radiation passing through a 260-nm cut-off filter from a 500-W Hg lamp to achieve a cross-linking density of 35% (confirmed by UV absorption analysis of the films at 274 nm). This treatment served to cross-link PCEMA in adjacent diblock copolymer chains—see, for more information Macromolecules 1996, 29, 2487 (Guo et al.) and Macromolecules 1997, 30, 488 (Henselwood et al.). Cross-linking was also verified qualitatively by confirming that the irradiated films were insoluble in dichloromethane whereas the film prior to irradiation was soluble in dichloromethane.

Figure 2:
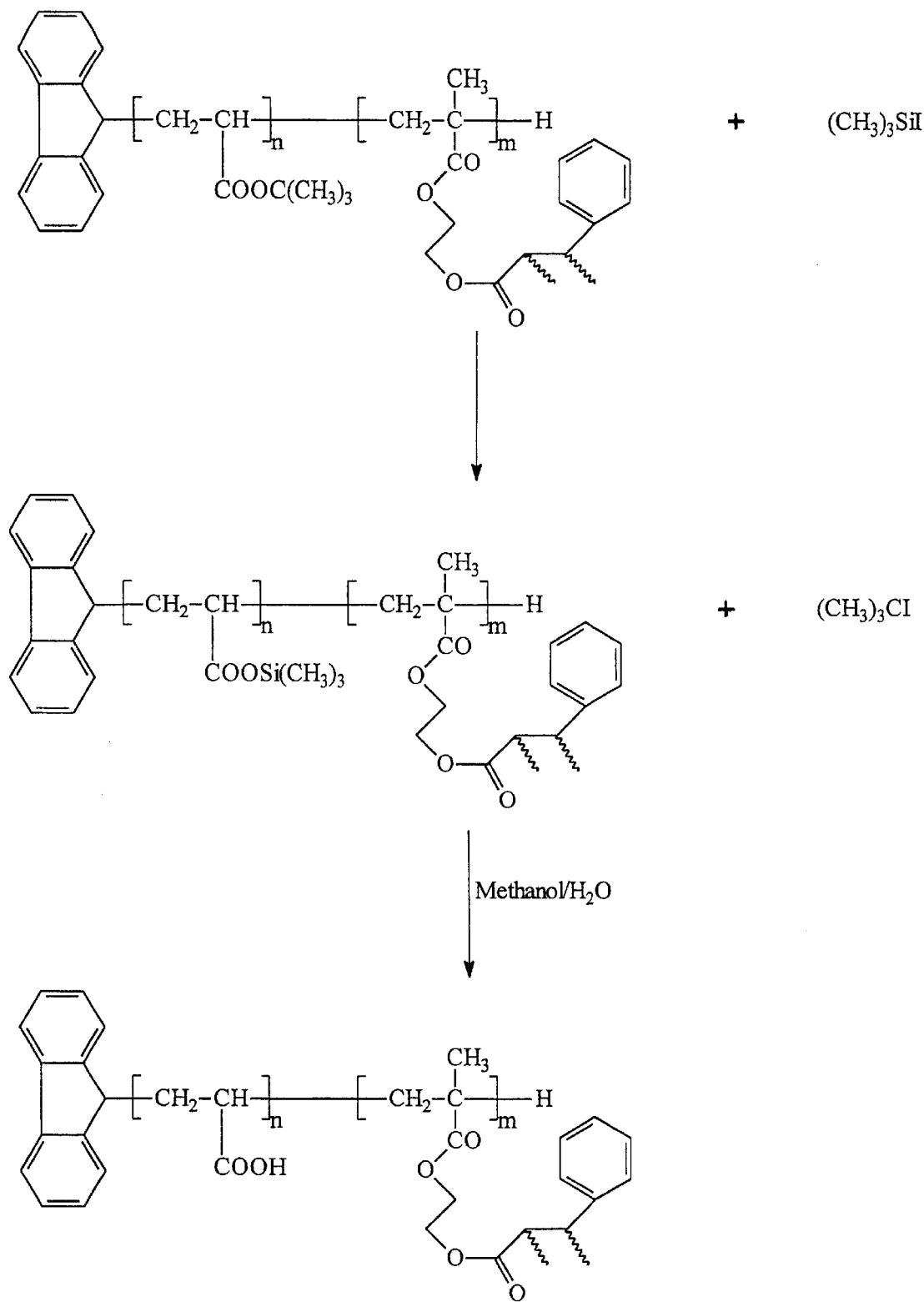
FIG. 2 illustrates a reaction pathway for a specific embodiment of the present invention.

The irradiated films were then soaked for 2–3 days in a 0.05 M solution of trimethylsilyl iodide ((CH$_3$)$_3$SiI) in dichloromethane. This treatment resulted in the first step of the reaction scheme illustrated in FIG. 2 (the wavy bonds in FIG. 2 are intended to mean a crosslinking to a similar moiety). As illustrated, the t-butyl moiety pendant on the PtBA block of the diblock copolymer is substituted with a trimethylsilyl moiety while the backbone of the diblock copolymer is unaffected.

Figure 3:
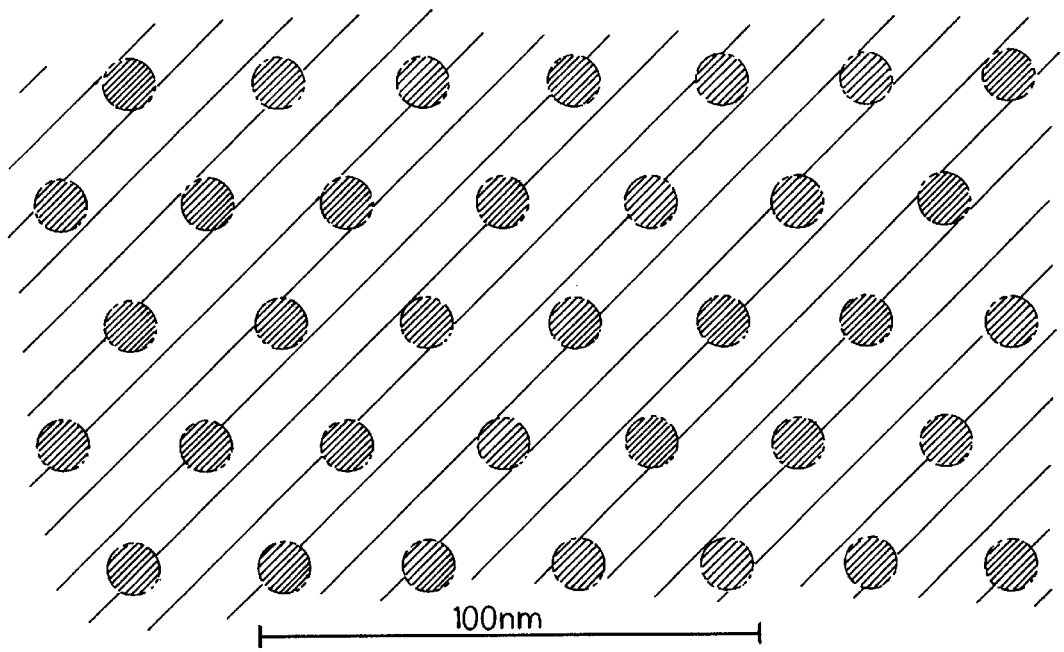
Figure 4:
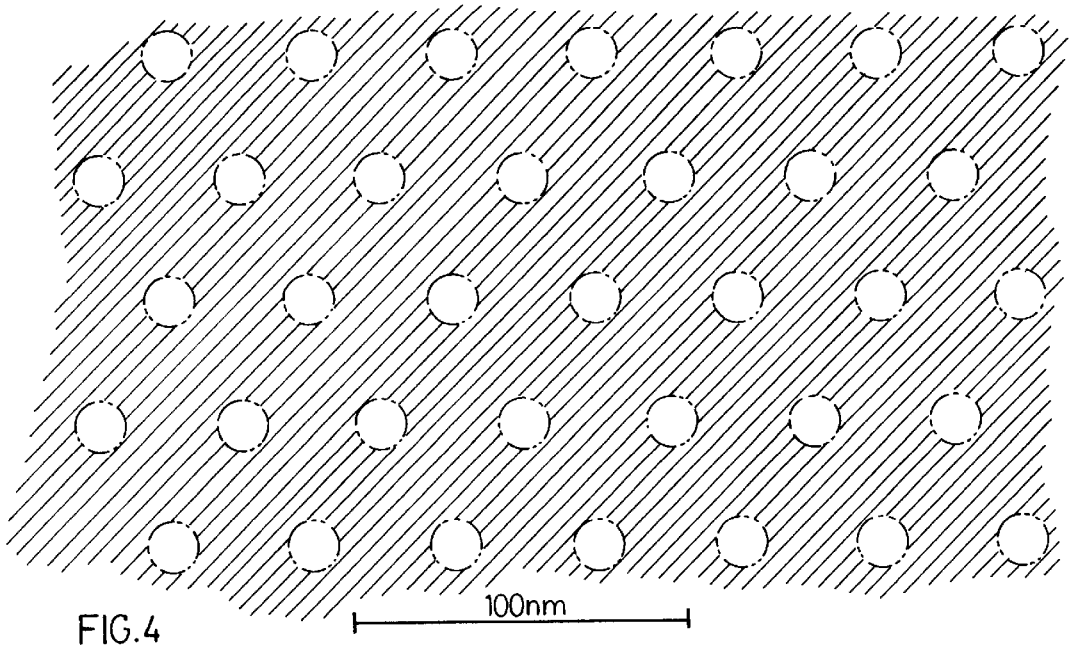

After treatment, the film was rinsed with dichloromethane and thereafter dried. A TEM image of the film (Polymer I), without OsO$_4$ staining is illustrated in FIG. 3. As shown, the portion of the film comprising PCEMA block of the diblock copolymer now appears relatively light (cf. FIG. 1) whereas the cylindrical domains are relatively dark. This confirms that the trimethylsilyl iodide reacted selectively with the PtBA block of the diblock copolymer. The PtBA block domains are darker since silicon is a more effective in electron scattering than the carbon, hydrogen and oxygen atoms found in PCEMA. A close analysis of FIG. 3 reveals that the average diameter of the dark cylinders is approximately 13 nm—i.e. similar to the diameter of the PtBA cylinders discussed above in reference to FIG. 1. The occurence of the first step of the reaction was further confirmed by experiments performed using a Zeiss 902 microscope equipped with an energy loss spectrometer. When the microscope was operated at 100 kV and a small area of a CH$_3$)$_3$SiI-treated film (Polymer II) was imaged using electrons with the energy of 100 keV–110 eV, FIG. 4 was obtained. As illustrated, the cylindrical domains now appear bright, as more electrons with the energy of 100 keV–110 keV emerged from the cylindrical domains than from the continuous phase. This was the case because the binding energy of the L-shell electrons of silicon was ~110 eV. The transfer of ~11-eV from some of the incident electrons to silicon should have produced a richer population of electrons with the energy of 100 keV–110 eV emerging from the silicon-rich cylindrical domains.

The trimethylsilyl moiety was then removed via hydrolysis by soaking the (CH$_3$)$_3$SiI-treated polymer films with a methanol/water mixture containing 5% water. This treatment resulted in the second step of the reaction scheme illustrated in FIG. 2 (the wavy bonds in FIG. 2 are intended to mean a crosslinking to a similar moiety). Again the pendent group on the acrylate-based block of the diblock copolymer is reacted with the backbone of the polymer remaining unaffected.

Figure 5:
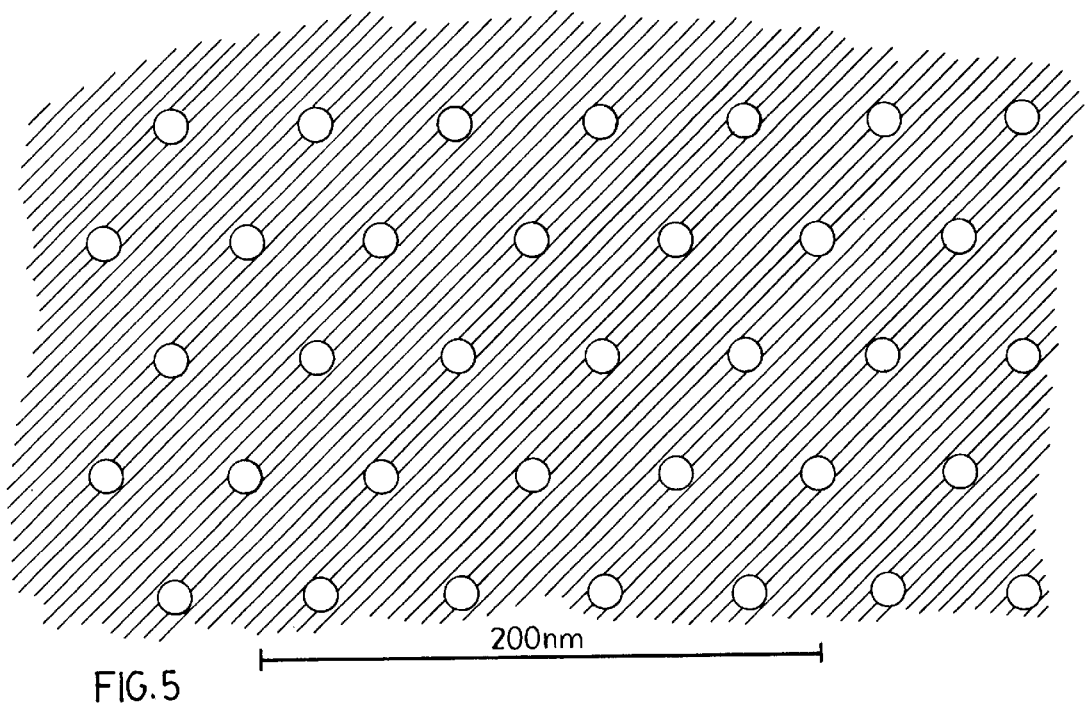

Silicon-specific imaging experiments demonstrated that the removal of trimethylsilyl groups attached to PAA was fast and could be achieved quantitatively in a matter of minutes. This fast hydrolysis reaction for the trimethylsilyl groups explained why the image shown in FIG. 4 was obtained without rinsing the film in dichloromethane. After removal of the trimethylsilyl groups, images with silicon-specific contrast no longer could be obtained. Illustrated in FIG. 5 is an image of a Polymer II film after the removal of the trimethylsilyl groups. As illustrated, the contrast between the light cylindrical regions and the dark PCEMA phase is now very sharp. Since the contrast was obtained without resorting to chemical staining, this suggests that the materials in the cylindrical regions were not as dense as in the continuous phase.

A close examination of FIG. 5 reveals that the brightness level is not uniform accross the white circles denoting the cylindrical domains. Very light inner circles appear to exist in the center of some of the white circles. The non-uniform brightness level in the cylindrical domains suggests that they are not empty.

The diameter of the cylinders in FIG. 5 was ~17 nm, which was the same, within measurement error, as the ~15 nm found for the PtBA cylinders of Polymer II.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A process for producing a polymeric material having a microporous matrix from a multi-block copolymer having a general formula:

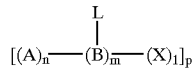

wherein:
   A is a first copolymerized monomer;
   B is a second copolymerized monomer;
   X is a third copolymerized monomer the same as or different from A;
   L is a leaving group, at least a portion of which is cleavable;
   n and m are the same or different and are each an integer in the range of from 30 to 3000;
   l is 0 or an integer in the range of from 30 to 3000;
   p is an integer in the range of from 1 to 100; the process comprising the steps of:
      (i) cleaving at least a portion of L from the multi-block copolymer to produce polymeric material having an intact backbone; and
      (ii) forming the microporous matrix in the multi-block copolymer at locations from which the at least a portion of L is removed from the multi-block copolymer.

2. The process defined in claim 1, wherein Step (i) comprises chemically cleaving at least a portion of L from the multi-block copolymer.

3. The process defined in claim 1, wherein Step (i) comprises radiatively cleaving at least a portion of L from the multi-block copolymer.

4. The process defined in claim 1, wherein Step (i) comprises removing at least a portion of substantially all moieties L from the multi-block copolymer.

5. The process defined in claim 1, wherein A comprises a cross-linkable moiety and the process comprises the further step of cross-linking A in respective chains of the multi-block copolymer.

6. The process defined in claim 5, wherein the cross-linking is conducted prior to Step (i).

7. The process defined in claim 5, wherein the cross-linking is conducted after Step (i).

8. The process defined in claim 1, wherein Step (ii) comprises forming a microporous matrix comprising a plurality of cylindrical pores.

9. The process defined in claim 1, wherein l is 0.

10. The process defined in claim 1, wherein n and m are the same or different and are each an integer in the range of from 50 to 2000.

11. The process defined in claim 1, wherein n and m are the same or different and are each an integer in the range of from 50 to 1000.

12. The process defined in claim 1, wherein n and m are the same or different and are each an integer in the range of from 50 to 500.

13. The process defined in claim 1, wherein p is 1.

14. The process defined in claim 1, wherein the microporous matrix comprises cylindrical pores having a diameter in the range of from about 0.5 to about 20 nm.

15. The process defined in claim 1, comprising the further step, prior to Step (i), of spreading the multi-block copolymer into a thin membrane.

16. The process defined in claim 15, wherein the spreading comprises casting the multi-block copolymer into the thin membrane.

17. The process defined in claim 1, comprising the further step, prior to Step (i), of spin casting the multi-block copolymer into a thin membrane.

18. The process defined in claim 15, wherein the multi-block copolymer is dissolved in a suitable inert solvent prior to spreading.

19. The process defined in claim 1, wherein the solvent is removed from the multi-block copolymer prior to Step (i).

20. The process defined in claim 1, wherein the membrane has a thickness less than about 20 $\mu$m.

21. The process defined in claim 1, wherein the membrane has a thickness in the range of from about 0.5 to about 15 $\mu$m.

22. The process defined in claim 1, wherein the membrane has a thickness in the range of from about 0.5 to about 10 $\mu$m.

23. The process defined in claim 1, wherein the membrane has a thickness in the range of from about 0.5 to about 5 $\mu$m.

* * * * *